United States Statutory Invention Registration [19]

[11] Reg. Number: H280

Thigpen [43] Published: Jun. 2, 1987

[54] CONNECTOR ASSEMBLY

[76] Inventor: Ben B. Thigpen, 13914 Kimberly La., Houston, Tex. 77079

[21] Appl. No.: 891,299

[22] Filed: Jul. 31, 1986

[51] Int. Cl.[4] ..... G02B 6/36; H01R 4/64; H04B 13/02; H04R 1/02

[52] U.S. Cl. ..... 429/7; 174/101.5; 340/850; 350/96.2; 367/3; 367/149; 367/191; 429/72; 439/206; 439/335

[58] Field of Search ..... 174/101.5; 339/117 R; 340/850; 350/96.2; 367/3, 149, 191

*Primary Examiner*—Deborah L. Kyle
*Assistant Examiner*—Brian S. Steinberger

[57] ABSTRACT

A connector assembly such that when a first half of the connector receives a second half, a vent hole is defined therethrough. With the second half disconnected and a third half coupled to the first half, the vent hole is sealed.

6 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CONNECTOR ASSEMBLY

BACKGROUND OF THE INVENTION

1. Field of the Invention

This invention relates to connectors, and particularly to a connector assembly for use on devices having substantially sealed housings which are subject to unwanted internal pressure build up.

2. Discussion of the Related Art

Certain devices such as sonobuoys used in seismic exploration and submarine detection consist substantially of a battery-powered data gathering and transceiver package enclosed in an elongate, essentially waterproof housing. The housing is capped by an antenna protruding therefrom and is operably coupled to the enclosed transceiver. An external connector located in the top of the housing may be mated to another connector which couples a sensor or a recharging line to the enclosed battery, data gathering, and transceiver package.

Usually, the fully charged sonobuoy is transported to a predetermined recording station by a small boat. A crew member deploys the sonobuoy and attached sensor in the water where the sonobuoy is activated. Signals propagating through the water are detected by the sensor, converted to electrical signals, and passed to the transceiver for transmission to a remote recording device.

After many hours of operation, the battery within the housing needs to be recharged. The sonobuoy is retrieved and taken to a recharging station where the sensor is disconnected from the external connector and a recharging line is coupled thereto. The battery may generate hydrogen gas during the recharging process which fills the housing. Usually a screw in the top may be loosened to vent the gas, but often the vent screw is not loosened resulting in the housing being pressurized by the generated hydrogen gas. The hydrogen gas may be ignited by a spark or a hot spot generated within the housing causing it to explode. On the other hand, the operator may not close the vent screw after recharging. The sonobuoy is redeployed in the water and is flooded through the open vent screw, shorting out the enclosed electronics.

SUMMARY OF THE INVENTION

It is an object of this invention to provide a connector assembly for use on devices having a substantially enclosed volume which may be subject to periods of unwanted pressure build up; the connector assembly capable of venting the enclosed volume in one configuration and resealing the volume in a second configuration.

It is another object of this invention to provide a connector assembly which is capable of maintaining electrical or optical continuity while venting or sealing the enclosed volume.

The connector assembly of this invention includes a first connector half which is mounted in the housing of the device. The first half of the connector assembly has a body, having a plurality of connectors and a longitudinal bore defining a passage extending therethrough. The longitudinal bore places the enclosed volume in fluid communication with the housing exterior.

A second half of the connector assembly mates with the first half in such a manner so that a plug in the second half is received by the longitudinal bore in the first half. The plug may have a longitudinal bore defined therein so as to extend the passage on through the connector assembly. This connector would be used during the charging cycle and thus provide a vent anytime the device was connected to the charger.

A third half of the connector assembly, substantially identical to the second half, mates with the first half of the assembly. The third half of the connector assembly has a plug which is received by the longitudinal bore in the first half, thus sealing the longitudinal bore. This would provide the connection to other devices and would, therefore, always be in place and preventing debris from entering thereon during use.

BRIEF DESCRIPTION OF THE DRAWINGS

A better understanding of the benefits and advantages of my invention may be obtained from the appended detailed description and the drawings, wherein.

DETAILED DESCRIPTION OF THE PREFERRED EMBODIMENT

Figure 1:
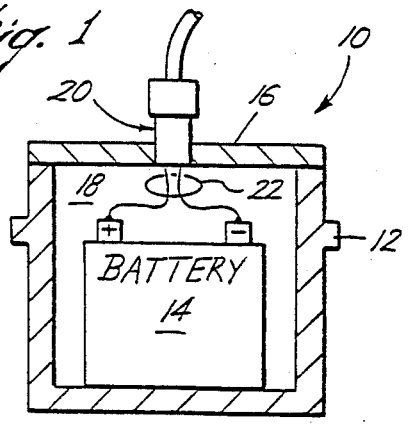
FIG. 1 is an elevational view of a device employing one embodiment of the inventive connector assembly.

In reference to the figures, like reference numerals indicate like components wherein FIG. 1 is shown a device 10 such as a battery pack having a housing 12 enclosing a rechargeable battery 14. The housing is sealed at the top by a cap 16, defining an enclosed volume 18 within the housing 12. A connector assembly 20 having a portion extending through and fixed in cap 16 is operably coupled via conductors 22 to the enclosed battery 14. It should be understood that for simplicity, only battery 14 is disposed within housing 12, but other electronic circuits may be contained therein and operably coupled via conductors or optical fibers to the connector assembly 20.

Figure 2:
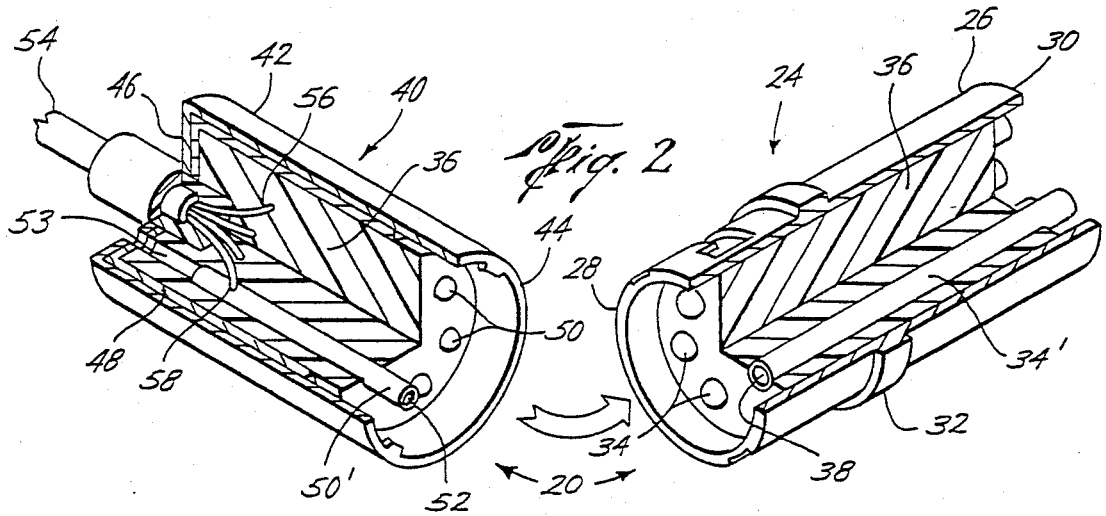
FIG. 2 is an isometric view in quarter cross-section of one embodiment of a male and female member of the connector assembly.

FIG. 2 is an isometric view in quarter cross-secton of one embodiment of the connector assembly 20 which includes a male member or first connector 24 having a substantially tubular body 26 defining a first and a second end, 28 and 30 respectively. Disposed approximately midway around the exterior of body 26 may be an annular flange 32. The exterior of body 26 from the flange 32 to the second end 30 may be threaded. It is the second end 30 of body 26 that extends through and fixed within the housing 12, up to the annular flange 32.

Disposed within the tubular body 26, parallel to a longitudinal axis thereof are a plurality of conductor pins 34. The conductor pins 34 are separated from each other and the body 26 in a predetermined pattern by a dielectric potting material 36 which substantially infills the tubular body 26 such that only a portion of each conductor-pin end extend from each end. At least one of the conductor pins 34, such as 34', is preferred to be tubular defining a longitudinal passage 38 extending through the dielectric potting material 36 and thus the first connector 24 of the connector assembly 20.

A female member or second connector 40 of the connector assembly 20 is shown opposite the male member 24. The second connector 40 may include a coupling sleeve 42 having a first and a second end 44 and 46 respectively, where the first end 44 receives and firmly holds the first end 28 of the first connector 24 of the connector assembly 20 when mated together. The coupling sleeve 42 contains an inner sleeve 48 which has a plurality of conductor pins 50 disposed therein substantially similar to pins 34 in the first connector 24. Pins 50 are separated from each other and the inner sleeve 48 by a dielectric potting material 36. One of the pins 50, such as 50′, may be substantially longer than the other pin and is preferred to be of lesser diameter. Pin 50′ may be tubular defining a longitudinal bore 52 very similar to the longitudinal passage 38. The longitudinal bore extends through pin 50′ and is continued on through the dielectric potting material 36 by a hole 53 extending through the second end 46 of the second connector 40. It is preferred that pin 50′ be received by pin 34′ and that a predetermined number of pins 50 mate with pins 34 when the first end 44 of the second connector 40 is coupled into the first end 28 of the first connector 24 thus placing longitudinal passage 38 in fluid communication with longitudinal bore 52. A conductor cable 54 having a plurality of conductors such as 56 is received in the second end 46 of the second connector 40 where an end 58 of each conductor may be coupled such as by the solder to each pin 50. Similarly, the ends of the pins 34 at the second end 30 of body 26 may be coupled to wire conductors.

Figure 3:
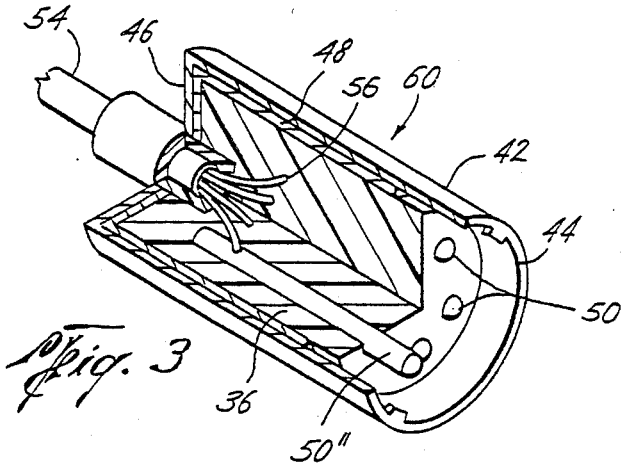
FIG. 3 is an isometric view in quarter cross-section of a second female member.

FIG. 3 is an isometric view of another female member or third connector 60 substantially identical to second connector 40 wherein a coupling sleeve 42 surrounds an inner sleeve 48, defining a first end 44 and a second end 46. Conductor pins 50 are disposed within the inner sleeve and separated from each other and the inner sleeve by the dielectric potting material 36. One of the pins 50″ is substantially longer than the other pins 50 and lesser in diameter but does not contain a longitudinal bore. The conductor pins 50 and 50″ are coupled to conductors 56 within a conductor cable 54 received in the second end 46. It is preferred that conductor pin 50″ be received by pin 34′ when the third connector 60 is coupled to the first connector 24 thus, sealing the longitudinal passage 38.

Figure 4:
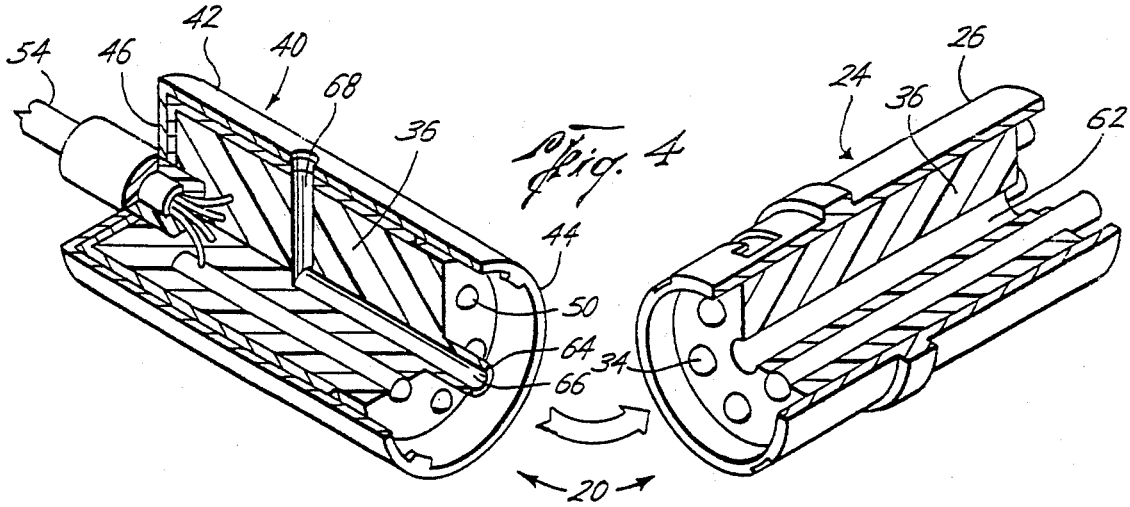
FIG. 4 is an isometric view in quarter cross-section of another embodiment of the connector assembly.

FIG. 4 is an isometric view in quarter cross-section of another embodiment of the connector assembly 20. FIG. 4 shows a first connector 24 and a second connector 40 substantially similar to those described above. In the alternate embodiment, an axial passage 62 is defined within the potting material 36 of the first connector 24 as opposed to in a conductor pin 34. An axial plug 64 extends from the potting material 36 in the female member which is received by the axial passage 62 when the connector halves 24 and 40 are coupled together. The axial plug 64 may have an axial bore 66 defined therein which intersects a transaxial bore 68 extending into the second connector 40. A third connector 60 may be substantially similar to the second connector 40 but with axial plug 64 being solid to seal the axial passage 62.

In operation, using the sealed battery pack as an example, the first connector 24 of connector assembly 20 receives second connector 40 when it is desired to recharge battery 14. Gas generated from the battery 14 during the recharging process is vented through the longitudinal passage 38 and out longitudinal bore 52 and hole 53 thus preventing internal pressurization of the volume 18 in housing 14. Second connector 40 is disconnected from the first connector 24 after recharging and the third connector 60 may be coupled thereto sealing the passage 38. Third connector 60 may interconnect another device to the battery pack 10 or may not have any conductor therein, acting as a "dummy" to seal the passage.

For illustrative purposes, my invention has been described with a certain degree of specificity. Variations such as using fiber optic means instead of electrical conductor pins will occur to those skilled in the art but which may be included within the scope and spirit of this invention which is limited only by the appended claims.

I claim as my invention:

1. A connector assembly for making electrical and optical interconnections between a first device, including a rechargeable, battery enclosed within a sealed housing, and a second and a third device external to said housing, said housing defining an enclosed volume around said first device subject to internal pressure build-up when said battery is recharged, said connector assembly comprising:

(a) a first connector extending through said housing and having a first plurality of conductor pins and a longitudinal passage extending therethrough, a predetermined number of said first plurality of conductor pins operably coupled to said first device:

(b) a second connector having a second plurality of conductor pins and a longitudinal bore extending therethrough, a predetermined number of said second plurality of conductor pins in said second connector operably coupled to said second device to charge said battery, said second connector detachably coupled to said first connector such that said first and second plurality of conductor pins of said first and second connectors engage each other, and said longitudinal bore receives said longitudinal passage placing said enclosed volume in fluid communication with the housing exterior; and (c) a third connector having a third plurality of conductor pins extending therethrough and having a male member, a predetermined number of said third plurality of conductor pins in said third connector operably coupled to said third device, said third connector detachably coupled to said first connector when said second connector is disconnected from said first connector such that said first and third plurality of conductor pins of said first and third connector engage each other and said male member is received by and seals said longitudinal passage.

2. An electrical or optical connector assembly for venting an enclosed volume within a housing subject to predetermined periods of pressure build-up, said connector assembly comprising:

(a) a first connector having a body extending through said housing and a first plurality of pins therein separated from each other in a predetermined pattern by a potting material, at least one of said first plurality of pins having a longitudinal passage extending therethrough and in fluid communication with said enclosed volume, a predetermined number of said first plurality of pins receiving a like number of conductors within said housing;

(b) a second connector having a body and a second plurality of pins therein separated from each other in a predetermined pattern by a potting material, a predetermined number of said second plurality of pins operably coupled to a first predetermined device exterior said housing, at least one of said second plurality of pins having a longitudinal bore extending therethrough and through said second connector, said second connector detachably coupled to said first connector such that said predetermined number of said first and second plurality of pins of said first and second connector engage each other and said at least one of said second plurality of pins having said longitudinal bore is received by said longitudinal passage in said first connector forming a continuous conduit through said connector assembly and placing said enclosed volume in fluid communication with the housing exterior; and (c) a third connector having a body and a third plurality of pins therein separated from each other in a predetermined pattern by a potting material, a predetermined number of said third plurality of pins operably coupled to a second predetermined device exterior said housing, said third connector detachably coupled to said first connector when said second connector is disconnected therefrom, such that a predetermined number of said first and third plurality of pins engage each other with one of said plurality of pins received by and sealing said longitudinal passage.

3. A connector assembly for making electrical and optical interconnections between a first device, including a rechargeable battery enclosed within a sealed housing, and a second and a third predetermined device external to said housing, said housing defining an enclosed volume around said first device subject to internal pressure build-up when said battery is recharged, said connector assembly comprising:

(a) a first connector having a body extending through said housing and a first plurality of pins longitudinally arranged therein separated from each other by a dielectric having an axial passage extending therethrough, a predetermined number of said first plurality of pins operably coupled to said battery; and (b) a second connector having a body including a first and a second end, a second plurality of pins longitudinally arranged therein, separated from each other by a dielectric, said dielectric having an axial male member extending from said first end, said male member having a longitudinal bore extending partially through said dielectric and in fluid communication with a transverse hole extending substantially through said second connector, a predetermined number of said second plurality of pins operably coupled to second predetermined device to charge said battery, said second connector detachably coupled to said first connector such that said predetermined number of said first and second plurality of pins are in intimate contact with each other and said male member is received in said axial passage forming a continuous conduit through said connector assembly and placing said enclosed volume in fluid communication with the housing exterior; and (c) a third connector having a body defining a first and second end, a third plurality of pins longitudinally arranged therein and separated from each other by a dielectric having an axial male member extending from said first end, a predetermined number of said third plurality of pins operably coupled to said third predetermined device powered by said battery, said third connector detachably coupled to said first connector when said second connector is detached such that said predetermined number of said first and third plurality of pins are in intimate contact with each other and said axial male member of said third conductor is received by and seals said axial passage and said enclosed volume.

4. A connector assembly for making a predetermined combination of electrical and optical interconnections between a plurality of devices, at least one of said plurality of devices disposed within an interior of a substantially sealed housing subject to first periods of internal pressurization, comprising:

(a) means, in a first configuration of said connector assembly, for providing pressure relief to said housing during said first periods of internal pressurization; and (b) means, in a second configuration of said connector assembly, for sealing said housing during second periods when said housing is not subject to internal pressurization.

5. A connector assembly as recited in claim 4, wherein said first configuration, comprises:

(a) a first connector extending through a wall of said housing and having a plurality of pins and a longitudinal passage extending therethrough in fluid communication with said interior of said housing, a predetermined number of said first plurality of pins receiving conductors interconnected to said at least one of said plurality of devices enclosed within said housing; and (b) a second connector having a second plurality of pins and a longitudinal bore extending therethrough, a predetermined number of said second plurality of pins receiving conductors interconnected to a predetermined one of said plurality of devices exterior said housing, said second connector detachably coupled to said first connector during said periods of internal pressurization of said housing such that said first and second plurality of pins in each connector are engaged, and said longitudinal bore receives said longitudinal passage placing said interior of said housing in fluid communication with the exterior of said housing.

6. A connector assembly as recited in claim 5, wherein said second configuration, comprises:

(a) a third connector having a third plurality of pins extending therethrough and a male sealing member, a predetermined number of said third plurality of pins receiving conductors interconnected to a third one of said plurality of devices external said housing, said third connector detachably coupled to said first connector during said second periods when said housing is not subject to internal pressurization and said second connector is disconnected from said first connector, such that said first and third plurality of pins in said first and third connector are engaged and said longitudinal passage receives and is sealed by said male sealing member and thereby sealing said housing.

* * * * *